United States Patent
Littlewood et al.

(10) Patent No.: US 12,435,741 B2
(45) Date of Patent: Oct. 7, 2025

(54) CYLINDER ASSEMBLY FOR TILTING A VACUUM TANK

(71) Applicant: The Charles Machine Works, Inc., Perry, OK (US)

(72) Inventors: Lance D. Littlewood, Edmond, OK (US); Levi J. Krutzfeldt, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 166 days.

(21) Appl. No.: 18/304,060

(22) Filed: Apr. 20, 2023

(65) Prior Publication Data

US 2023/0340972 A1    Oct. 26, 2023

Related U.S. Application Data

(60) Provisional application No. 63/332,765, filed on Apr. 20, 2022.

(51) Int. Cl.
  *F15B 15/14*  (2006.01)
  *F15B 1/26*   (2006.01)
(52) U.S. Cl.
  CPC ............ *F15B 15/1428* (2013.01); *F15B 1/26* (2013.01)

(58) Field of Classification Search
  CPC .......... F15B 2211/7107; F15B 15/1428; F15B 15/1404; B60P 3/2245
  See application file for complete search history.

(56) References Cited

U.S. PATENT DOCUMENTS

| | | | |
|---|---|---|---|
| 5,010,620 A * | 4/1991 | Young | A01C 3/04 15/348 |
| 5,996,171 A * | 12/1999 | Bowers | B01D 50/20 15/340.1 |
| 8,360,260 B2 | 1/2013 | Maybury, Jr. | |
| 8,667,717 B2 | 3/2014 | Maybury, Jr. et al. | |
| 10,221,602 B2 | 3/2019 | Sewell | |
| 10,844,574 B2 | 11/2020 | Bural et al. | |
| 2011/0107548 A1 | 5/2011 | Maybury, Jr. | |

* cited by examiner

*Primary Examiner* — Abiy Teka
(74) *Attorney, Agent, or Firm* — Tomlinson McKinstry, P.C.

(57) ABSTRACT

A dual-cylinder tilting assembly for use with a vacuum tank. The tank is mounted on a frame, such as a trailer or a truck bed, at a pivotal connection at its end. A door is disposed near the end with the pivotal connection. The tilting assembly is at the other end, and has two cylinders with their rods facing alternate directions. The rod of one of the cylinders is pivotally attached to the frame and the rod of the other is pivotally attached to the tank. The barrels of the two cylinders are joined physically and hydraulically linked. The cylinder assembly, when fully extended, extends approximately three times its unextended length and tilts the tank at an angle of thirty to fifty degrees.

16 Claims, 8 Drawing Sheets

CYLINDER ASSEMBLY FOR TILTING A VACUUM TANK

SUMMARY

The present invention is directed to a vacuum system. The vacuum system comprises a tank, a frame, and a cylinder assembly. The tank extends from a first end to a second end. The tank comprises a door disposed at the second end and a mount disposed at the first end. The frame is supported by a plurality of ground supporting members. The tank is supported on the frame. The cylinder assembly comprises a first cylinder and a second cylinder. The first cylinder comprises a first barrel and a first rod. The second cylinder comprises a second barrel and a second rod. The first cylinder is attached to the frame at a first connection point. The second cylinder is attached to the mount at a second connection point. The first barrel and second barrel are joined together.

In another aspect the invention is directed to a cylinder assembly. The cylinder assembly comprises a first cylinder, a second cylinder, and a hydraulic supply. The first cylinder comprises a first barrel and a first rod, where the first rod is extendable from the first barrel in a first direction. The second cylinder comprises a second barrel and a second rod. The second rod is extendable from the second barrel in a second direction. The second direction is opposite from the first direction. The hydraulic supply is in fluid communication with each of the first barrel and the second barrel. The first barrel and the second barrel are fixed in position relative to each other by a brace.

DETAILED DESCRIPTION

Vacuum tanks are used in underground construction applications to remove material from an excavation. Often fluid is used to lubricate a drill bit during drilling operations. Fluid then migrates up a borehole into a pit. In other applications, fluid such as air or water is used to dislodge soil from around a buried utility. The dislodged soil must then be removed to fully uncover the utility. A vacuum system allows this fluid to be removed and, in some circumstances, reused, reducing the environmental footprint associated with underground construction operations.

Material which is removed to a vacuum tank, however, is often quite viscous. Drilling mud and mud material may be difficult to remove from the body of a vacuum tank, slowing operations and limiting the ability to quickly empty the tank for continued use.

The tilt angle of a vacuum tank is limited by the stroke of its cylinder. In traditional vacuum tanks, one or two tilt cylinders are provided on a trailer assembly, and extend to tilt the cylinder, allowing gravity to excavate the cylinder. Given the viscosity of the material involved, providing a longer stroke without increasing the profile of the vacuum system or sacrificing strength is quite important.

Turning now to the figures, a trailer mounted vacuum system 10 is shown therein. The vacuum system includes a tank 12. The tank 12 has a door 14 disposed at one end. The tank 12 is supported by a trailer 15 with one or more ground support members 16, such as wheels. As shown, the trailer 15 has four wheels disposed proximate the door 14. A hitch 18 or other connection is disposed at the other end of the trailer.

The door 14 of the tank 12 is opened and closed by a hydraulic closure assembly 20. Different assemblies are known in the art. Shown in the figures is an assembly 20 disclosed in U.S. Pat. No. 10,221,602, issued to Sewell, the contents of which are incorporated herein by reference.

In traditional operations, tanks 12 mounted on trailers 15 are tilted by individual cylinders mounted on the side of the tank, or a single telescoping cylinder on the front of the tank. The mechanical advantage is the greatest when lifting from the front of the tank, but the stroke is often greater, as the cylinder barrel is already upright. Lifting along the side of the tank may allow a shorter stroke, but reduces mechanical advantage and requires more robust cylinders.

As shown in the figures, in the present invention, a piggyback cylinder assembly 30 is mounted on the front of the tank between a trailer mount 40 and a tank mount 50. The piggyback cylinder assembly 30 provides a lifting mechanism which uses two hydraulically connected cylinders 32, 34. The assembly 30 provides advantages of lifting from the front of the tank 12 while controlling cost, complexity, and allowing for a large tilt angle. As the cylinder assembly 30 extends, the tank 12 is caused to pivot about a tank pivot connection 35.

The cylinder assembly 30 comprises a first cylinder 32 and a second cylinder 34. The first cylinder 32 and second cylinder 34 are connected by a hydraulic conduit 36 which equalizes the pressure within each cylinder 32, 34. Thus, when hydraulic fluid is provided to the assembly 30, both cylinders are pressurized, causing rods to extend from each cylinder 32, 34. The rod of the first cylinder 32 is oriented in the opposite direction as the rod of the second cylinder 34. In this way, the extended length of the cylinder assembly 30 is approximately three times the retracted length of the cylinder assembly, subject to the small differences between the rod length and unextended cylinder length and offsets between the cylinders 32, 34.

The cylinders 32, 34 are joined together at one or more braces 38. The cylinders 32, 34 may be welded at the braces 38. Hydraulic supply lines 60 extend from a bottom side of the tank 12 to ports 62. Preferably, the ports 62 are closer to the tank 12 when extended than when retracted. In this way, the hydraulic supply lines 60 may be kept away from moving portions of the assembly 30 and excess slack in the lines 60 exists only when extended and the lines are far from pinch points on the assembly 30.

The cylinders 32, 34 are sized such that the tank 12 is flat on the trailer 15 when fully retracted, and at a significant angle (measured at the tank pivot point 35) when fully extended, as shown in FIGS. 4-7. The angle may be between thirty and fifty degrees from horizontal. As shown, the system is engineered for a fully-extended forty degree angle.

The tank mount 50 extends forward and away from the tank 12. As shown, a connection point 52 on the tank mount 50 is further away from the tank than a connection point 42 on the trailer mount 40. As the cylinder assembly 30 extends, connection point 52 passes through and across a vertical plane 100 extending through the connection point 42. When the cylinder assembly 30 is retracted, the connection point 52 is on an opposite side of the plane 100 from the tank 12. When the cylinder assembly 30 is extended, the connection point 52 and tank 12 are on the same side of the plane 100. This arrangement is demonstrated by FIGS. 8A and 8B, where the extension of the cylinder assembly 30 causes the connection point 52 to cross over the plane 100.

Figure 1:
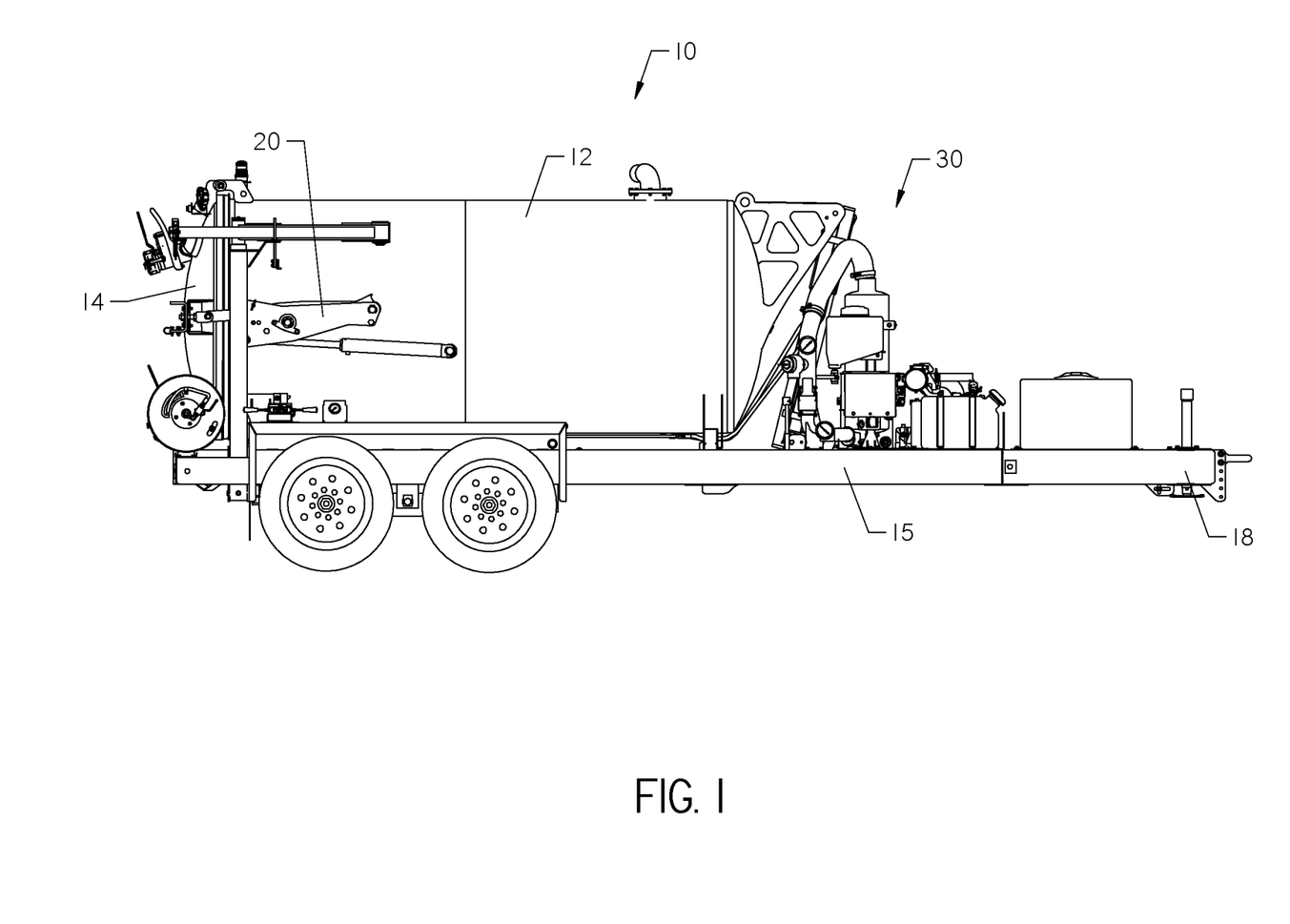
FIG. 1 is a side view of a vacuum tank assembly disposed on a trailer with a tilt cylinder in its retracted position.
Figure 2:
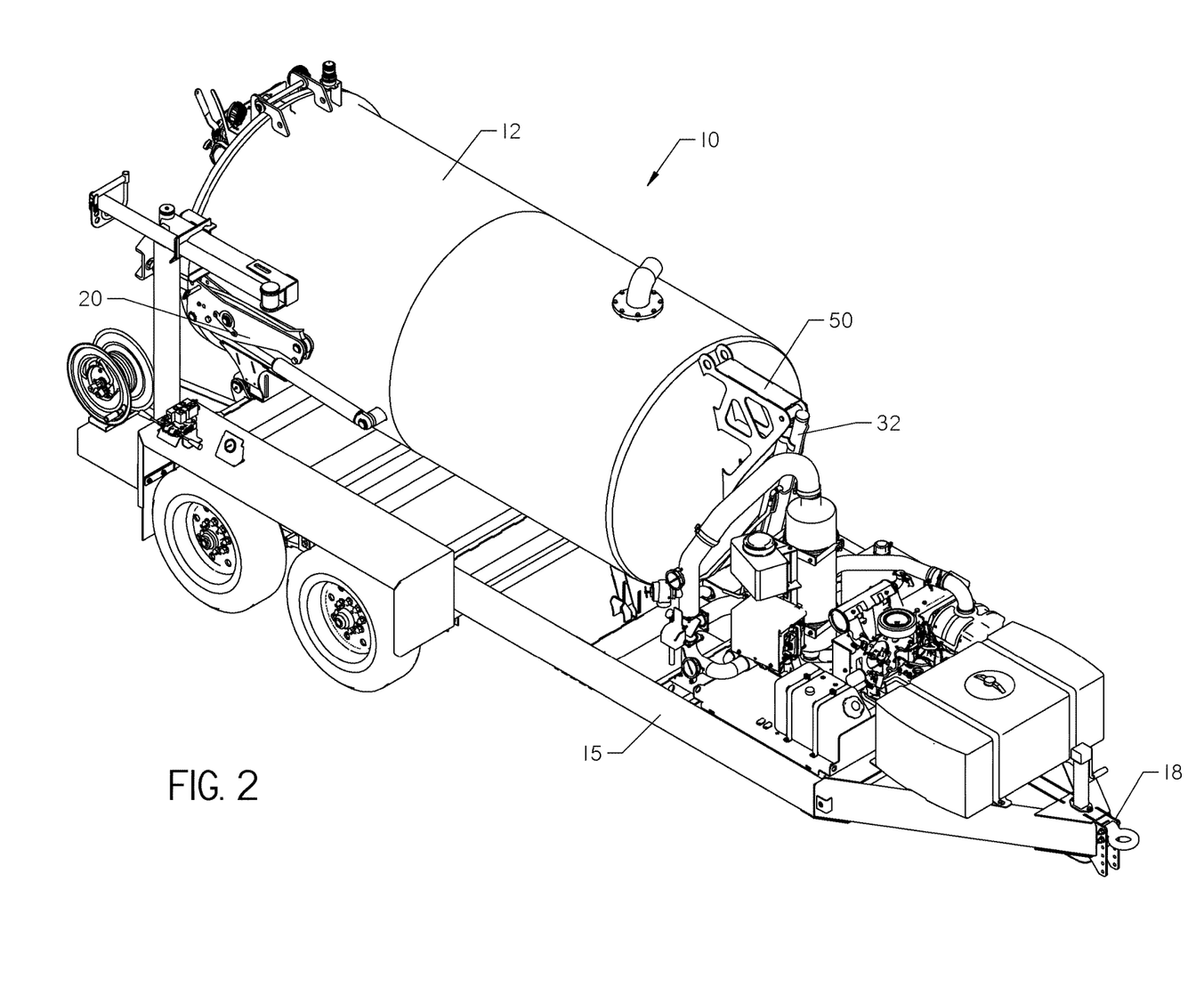
FIG. 2 is a top right front perspective view thereof.
Figure 3:
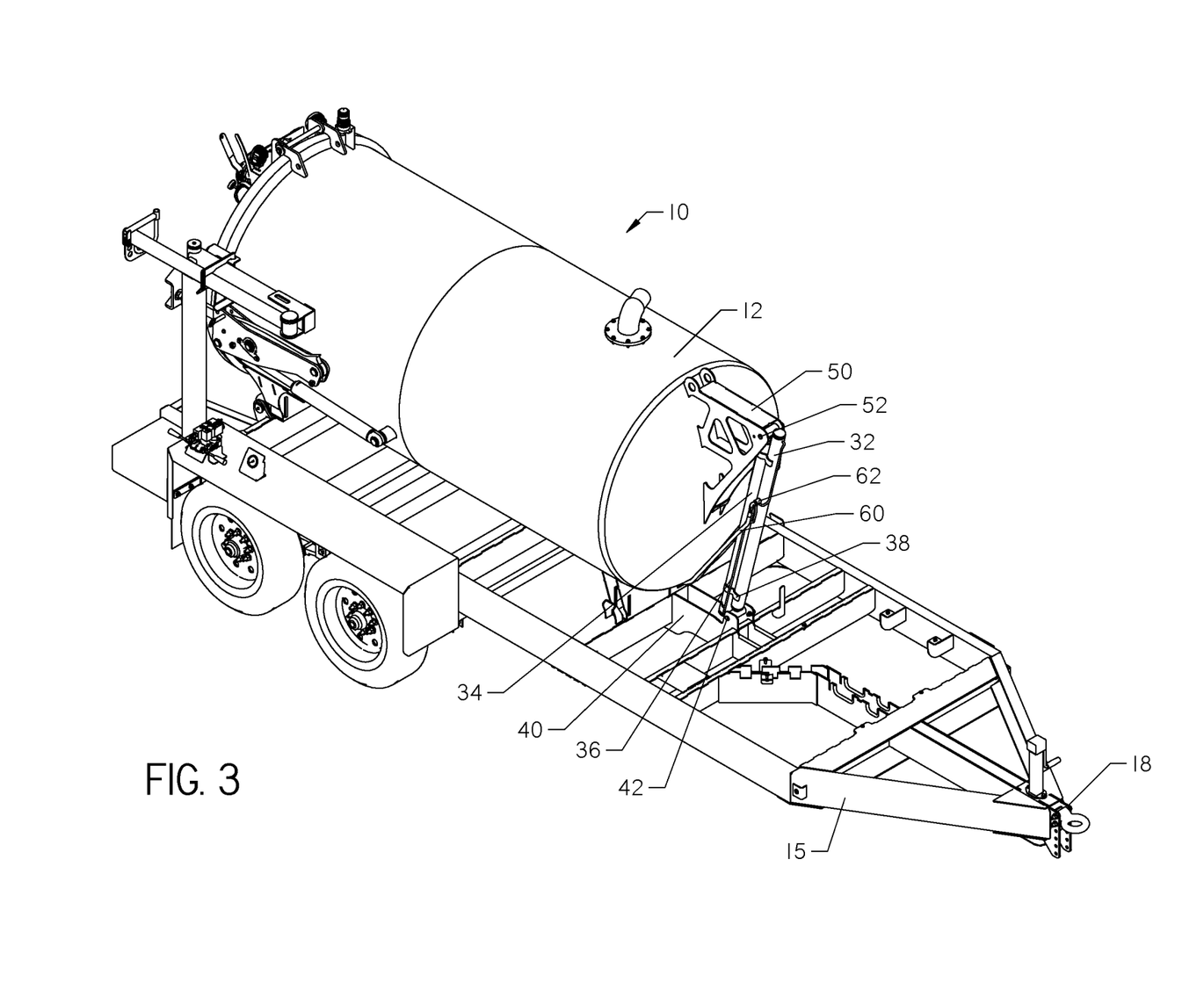
FIG. 3 is the view of FIG. 2 with components of the vacuum system external from the tank removed so that the tilt cylinder is visible.
Figure 4:
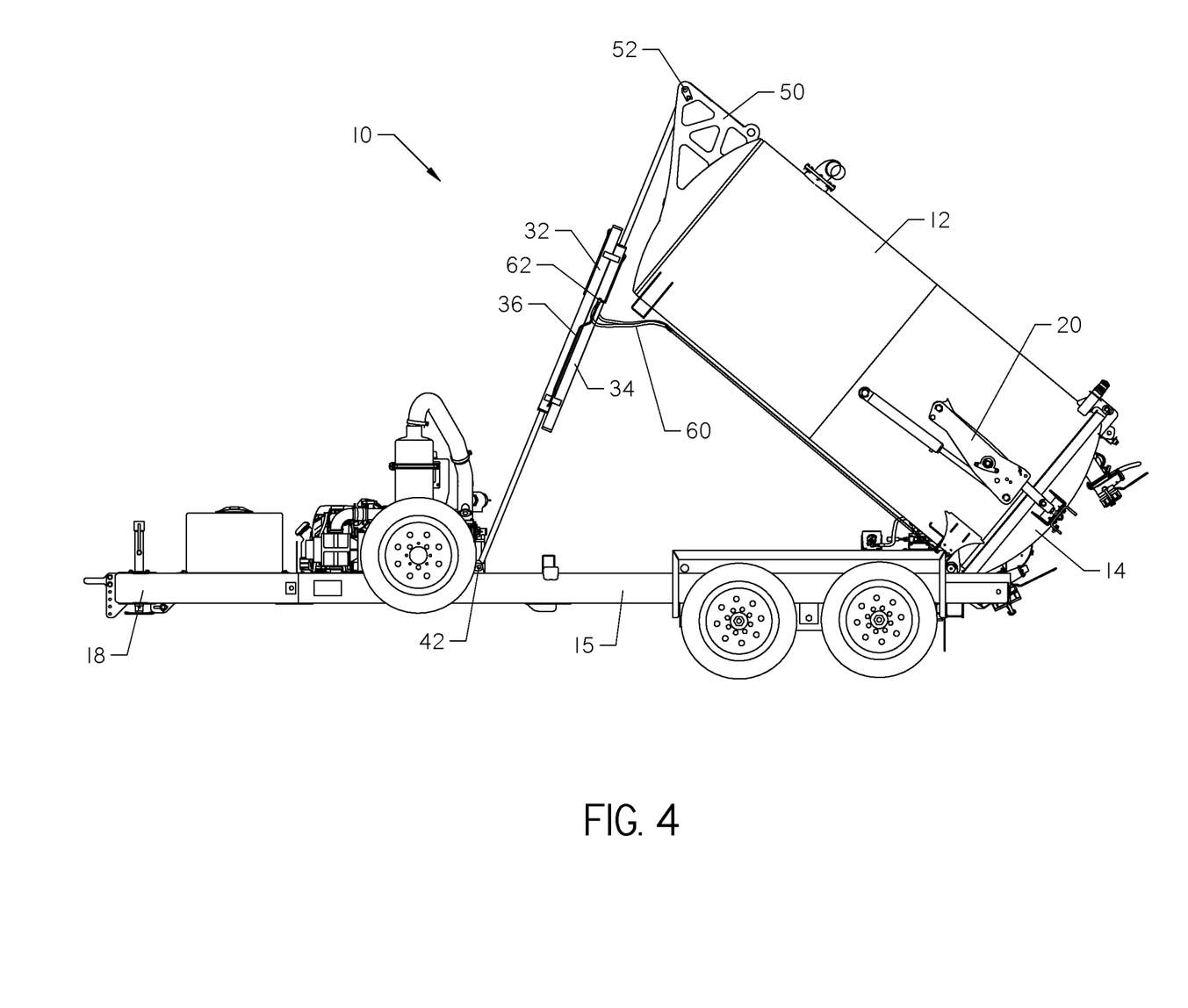
FIG. 4 is a side view of the vacuum tank assembly disposed on a trailer with a tilt cylinder in its fully extended position.
Figure 5:
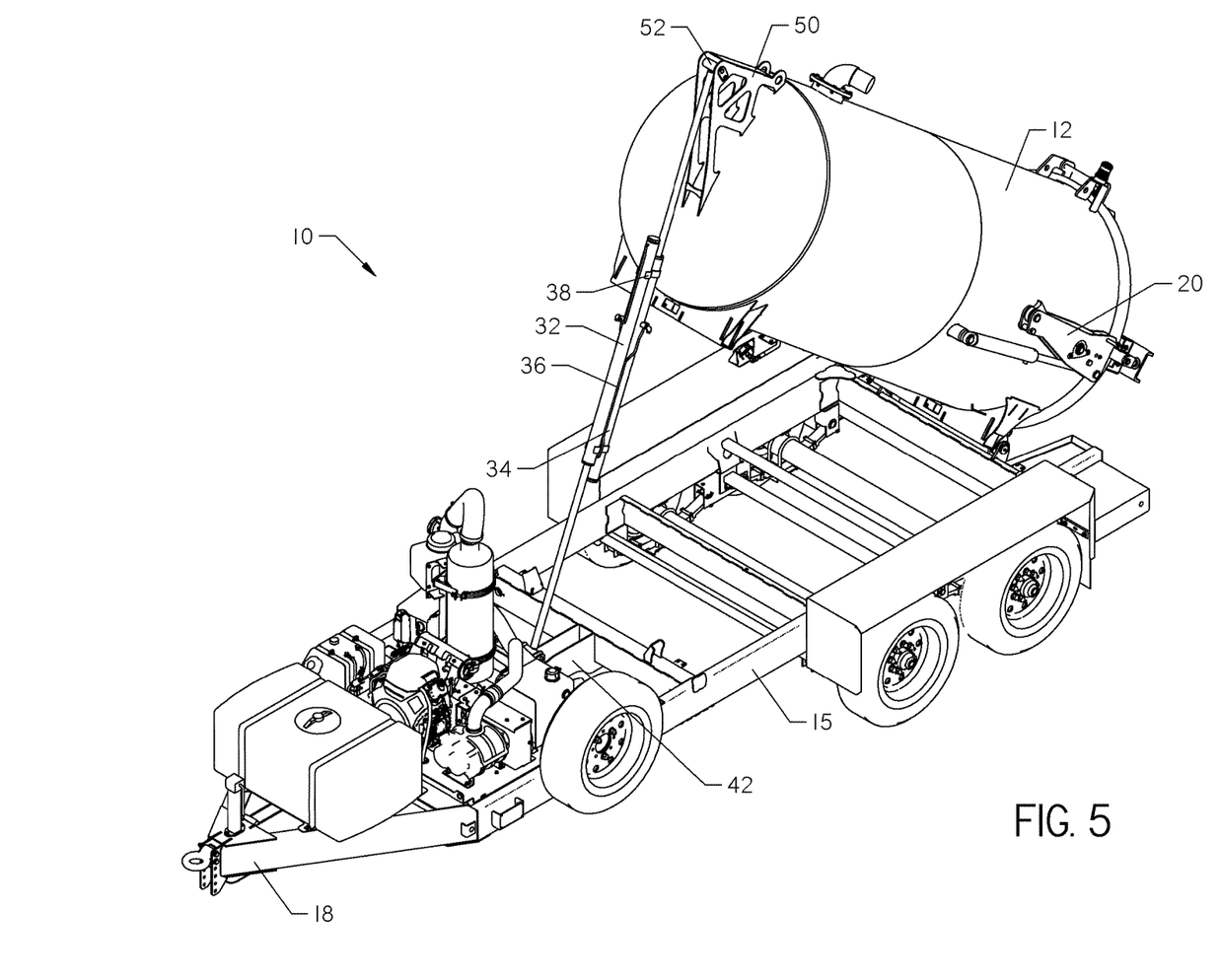
FIG. 5 is a left front top perspective view thereof.
Figure 6:
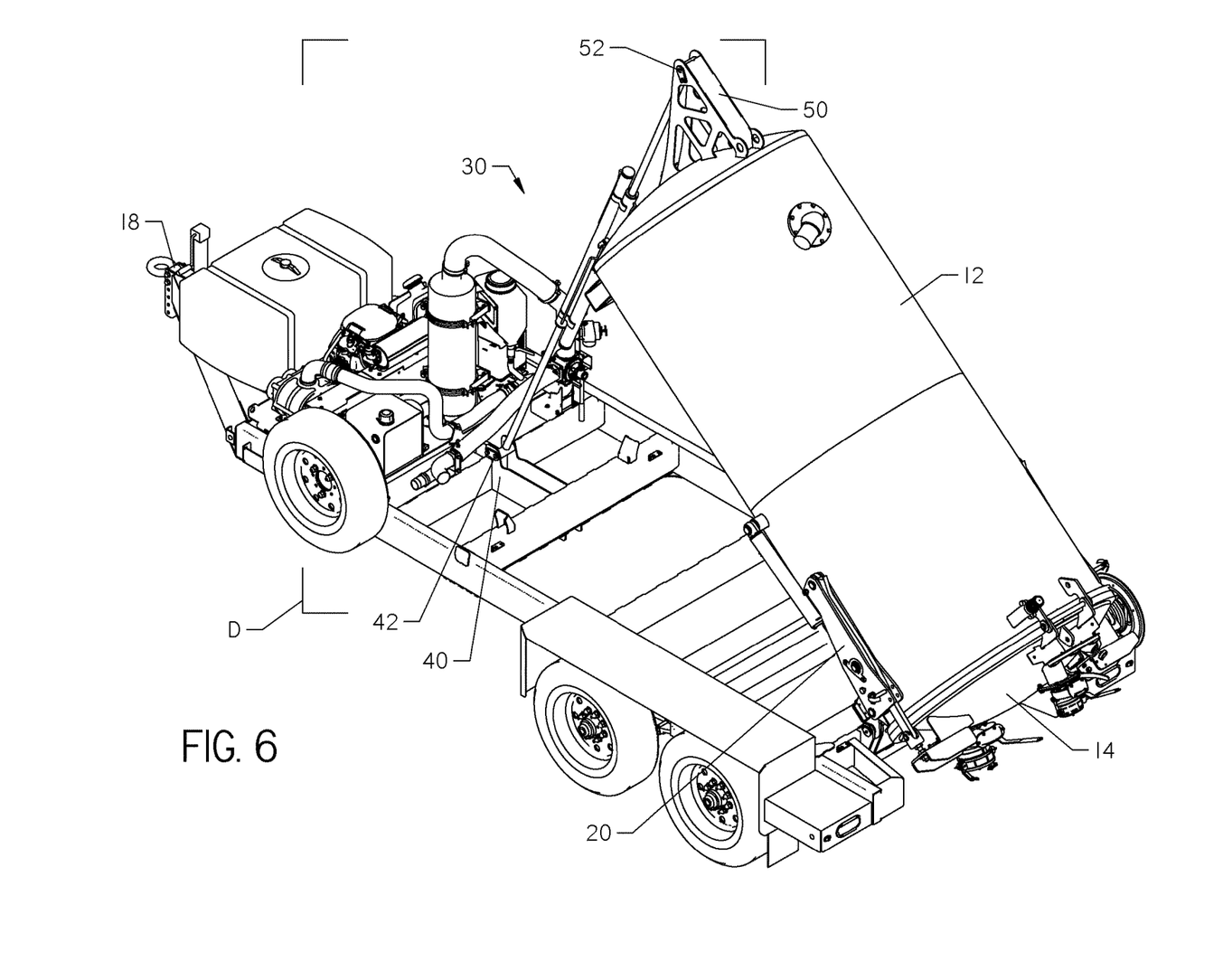
FIG. 6 is a left back top perspective view thereof.
Figure 7:
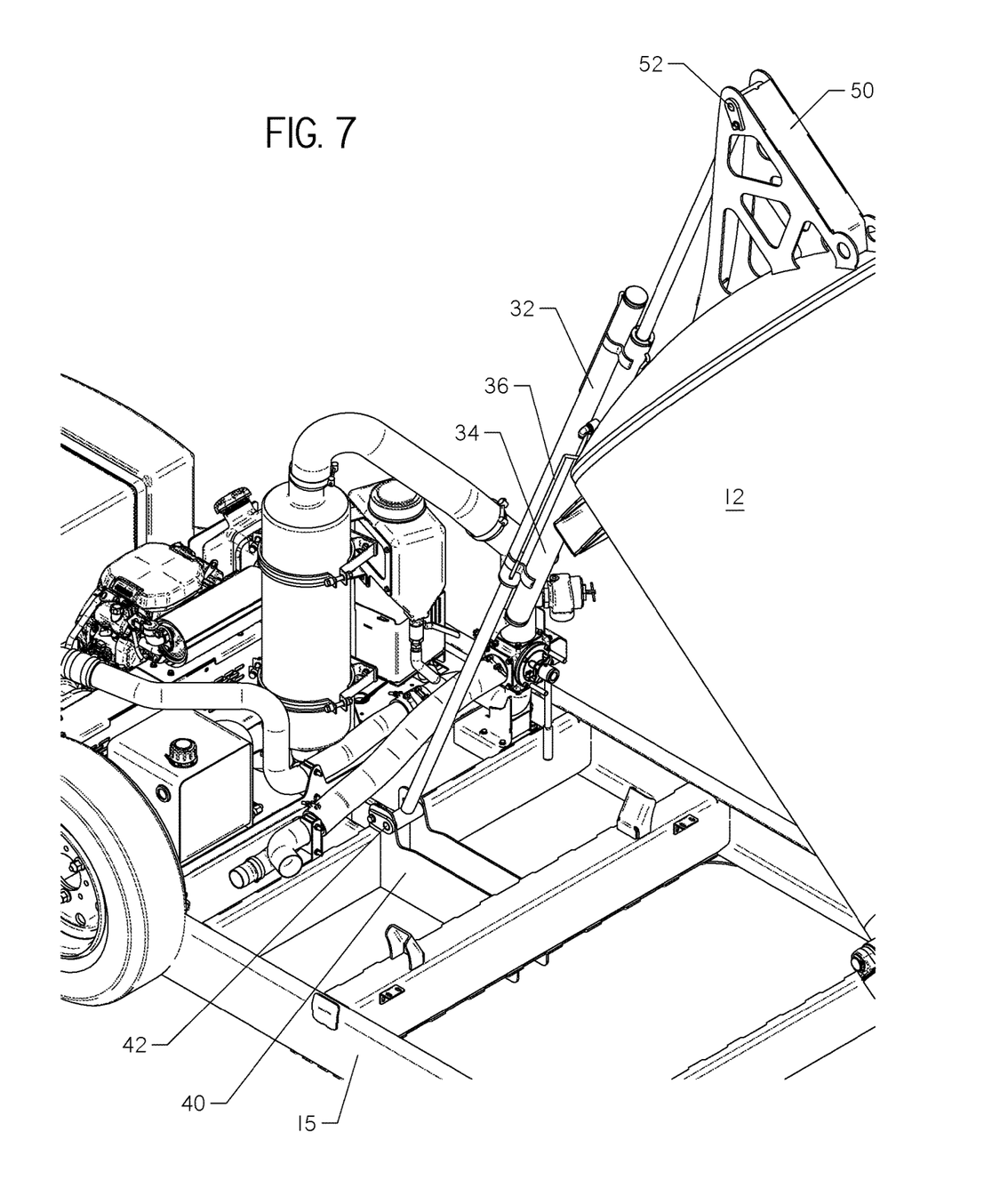
FIG. 7 is detail D of FIG. 6.
Figure 8A:
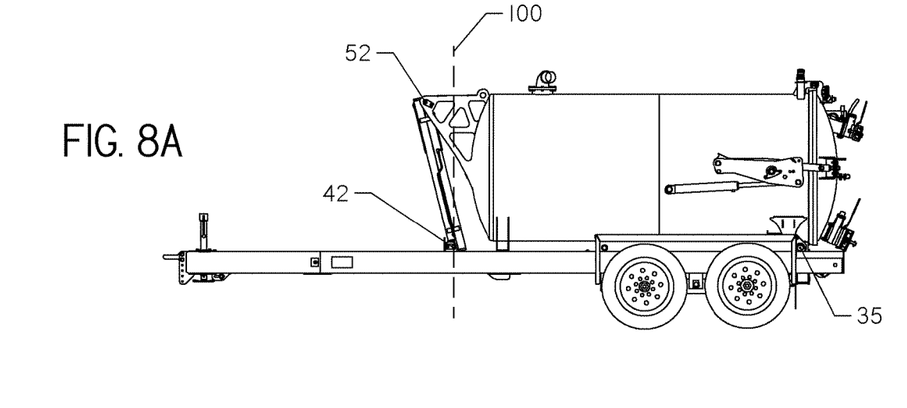
FIG. 8A is a side view of the vacuum tank assembly with a dashed line representing a plane disposed through a connection point between a cylinder assembly and the trailer. The connection point between the tank mount and the cylinder assembly is on a first side of the plane.
Figure 8B:
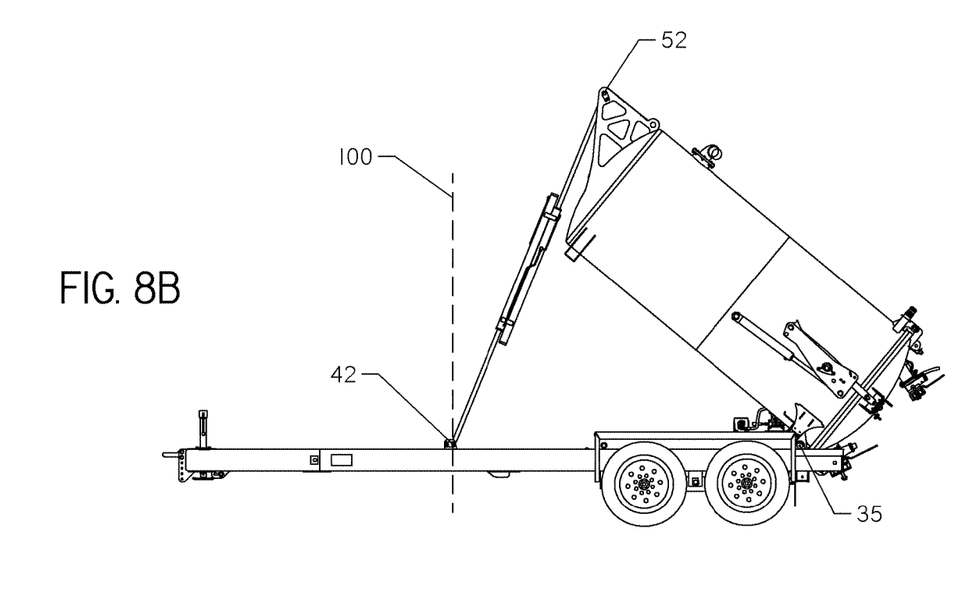
FIG. 8B is a side view of the vacuum tank assembly of FIG. 8A with the cylinder extended. The connection point between the tank mount and the cylinder assembly is on a second side of the plane.

In other words, the connection point 52 is closer, in horizontal distance, to the tank pivot point 35 than the connection point 42 when the cylinder assembly 30 is fully extended, and further from the tank pivot point 35, in horizontal distance, than the connection point 42 when the cylinder assembly 30 is retracted.

The trailer mount 40 comprises ears similar to a dump truck to allow the tank 12 to return to the same position even if on an incline.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A vacuum system, comprising:
   a tank extending from a first end to a second end, comprising:
      a door disposed at the second end; and
      a mount disposed at the first end;
   a frame supported by a plurality of ground-supporting members, wherein the tank is supported on the frame; and
   a cylinder assembly comprising:
      a first cylinder comprising a first barrel and a first rod, wherein the first rod is attached to the frame at a first connection point; and
      a second cylinder comprising a second barrel and a second rod, wherein the second rod is attached to the mount at a second connection point;
      wherein the first barrel and second barrel are joined together;
   wherein the tank is pivotally attached to the frame at its second end at a third connection point; and
   wherein a first horizontal distance is defined by a horizontal distance between the first connection point and third connection point and a second horizontal distance is defined by a horizontal distance between the second connection point and the third connection point, wherein:
      the first horizontal distance is greater than the second horizontal distance when the first rod and the second rod are fully extended; and
      the first horizontal distance is less than the second horizontal distance when the first rod and the second rod are fully retracted.

2. A vacuum system, comprising:
   a tank extending from a first end to a second end, comprising:
      a door disposed at the second end; and
      a mount disposed at the first end;
   a frame supported by a plurality of ground-supporting members, wherein the tank is supported on the frame; and
   a cylinder assembly comprising:
      a first cylinder comprising a first barrel and a first rod, wherein the first rod is attached to the frame at a first connection point; and
      a second cylinder comprising a second barrel and a second rod, wherein the second rod is attached to the mount at a second connection point;
      wherein the first barrel and second barrel are joined together such that they are hydraulically joined.

3. The vacuum system of claim 2 in which the frame is disposed on a trailer.

4. The vacuum system of claim 2 in which the frame is disposed on a truck.

5. The vacuum system of claim 2 in which hydraulic supply lines extend along a bottom side of the tank to a port on the first barrel and a port on the second barrel.

6. The vacuum system of claim 5 in which the port on each of the barrels is closer to the tank when the first rod and the second rod are fully extended than when the first rod and the second rod are fully retracted.

7. A cylinder assembly, comprising:
   a first cylinder comprising a first barrel and a first rod, wherein the first rod is extendable from the first barrel in a first direction;
   a second cylinder comprising a second barrel and a second rod, wherein the second rod is extendable from the second barrel in a second direction, the second direction being opposite the first direction; and
   a hydraulic supply in fluid communication with each of the first barrel and the second barrel;
   wherein the first barrel and second barrel are fixed in position relative to each other by a brace.

8. The cylinder assembly of claim 7 wherein the brace is welded to the first barrel and the second barrel.

9. The cylinder assembly of claim 7 in which the first barrel and the second barrel are in fluid communication.

10. A system comprising:
   a frame;
   a tank supported by the frame and pivotally attached to the frame proximate a second end of the tank; and
   a cylinder assembly, comprising:
      a first cylinder comprising a first barrel and a first rod, wherein the first rod is extendable from the first barrel in a first direction;
      a second cylinder comprising a second barrel and a second rod, wherein the second rod is extendable from the second barrel in a second direction, the second direction being opposite the first direction; and a hydraulic supply in fluid communication with each of the first barrel and the second barrel;

wherein the first barrel and second barrel are fixed in position relative to each other by a brace;

wherein the first rod is pivotally connected to the frame and the second rod is pivotally connected to the tank proximate a first end of the tank.

11. The system of claim 10 in which the tank comprises a mounting frame, wherein the second rod is pivotally connected to the tank at the mounting frame.

12. The system of claim 11 in which an angle is formed between the first rod and the frame, wherein the tank is situated in the area between the frame and the first rod defined by the angle, wherein:

the angle is obtuse when the first rod and the second rod are fully retracted; and the angle is acute when the first rod and the second rod are fully extended.

13. The system of claim 10 further comprising:

a vacuum system connected to the tank; and a door, joined to the tank and covering the second end thereof.

14. A method of using the system of claim 13, comprising:

with the door covering the second end of the tank, removing spoils from a worksite to within the tank with the vacuum system;

opening the door to uncover the open second end of the tank;

with the hydraulic system, providing hydraulic fluid to the cylinder assembly, thereby extending the first rod and the second rod and rotating the tank relative to the frame.

15. The system of claim 10 wherein the tank is configured to be rotated between thirty and fifty degrees relative to the frame when the first rod and the second rod are fully extended.

16. The system of claim 10 wherein the tank is configured to be rotated forty degrees relative to the frame when the first rod and the second rod are fully extended.

* * * * *